UNITED STATES PATENT OFFICE.

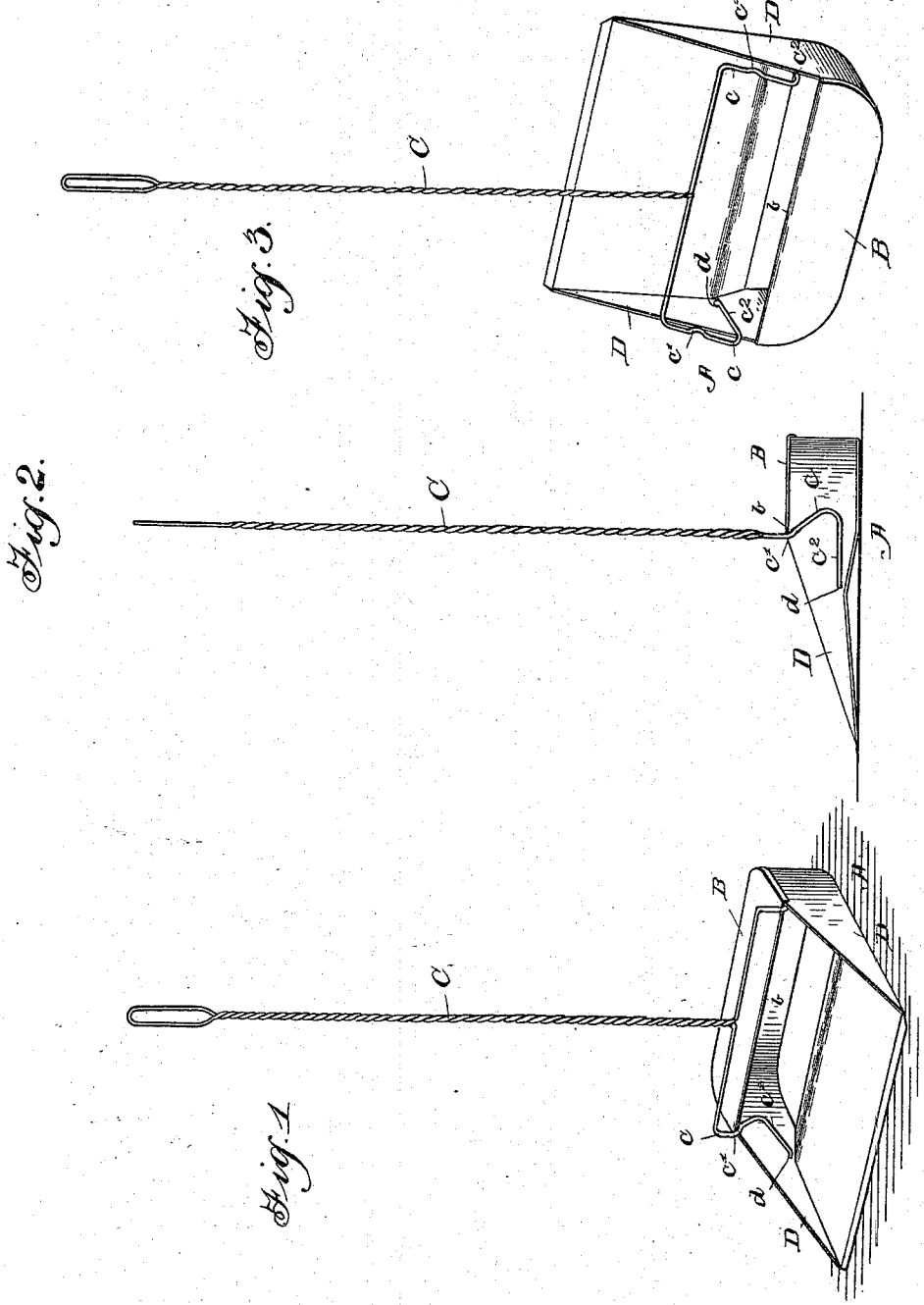

ANNA C. GEROW, OF PORT HURON, MICHIGAN.

DUST-PAN.

SPECIFICATION forming part of Letters Patent No. 573,460, dated December 22, 1896.

Application filed July 14, 1896. Serial No. 599,103. (No model.)

*To all whom it may concern:*

Be it known that I, ANNA C. GEROW, a citizen of the United States, residing at Port Huron, in the county of St. Clair and State of Michigan, have invented certain new and useful Improvements in Dust-Pans; and I do declare the following to be a full, clear, and exact description of the invention, such as will enable others skilled in the art to which it appertains to make and use the same.

My invention has relation to dust-pans for household use, and the object is to provide a simple, cheap, and convenient device of this class; and to this end the novelty consists in the construction, combination, and arrangement of the same, as will be hereinafter more fully described, and particularly pointed out in the claim.

In the accompanying drawings the same letters of reference indicate the same parts of the invention.

Figure 1 is a perspective view of my improved dust-pan as it appears in use. Fig. 2 is a section of the same, and Fig. 3 is a perspective view of the same as it appears when used to transfer the dust and litter from one place to another.

A is the pan, and it is formed with a hood or dust-receptacle B.

C is the handle, which extends downward and outwardly and then downwardly to form spring-arms $c\ c$, each of which is formed with notches $c'$, and their lower angular ends $c^2$ are pivoted in orifices $d$ in the sides D of the pan proper. When the handle is in the upright position shown in Figs. 1 and 2, the notches $c'\ c'$ engage the beaded flange $b$ of the dust-chamber B and retain the handle in said position, while if the handle be thrown slightly forward to release the notches $c'$ from the beaded edge of the dust-chamber the said chamber overbalances the front part of the pan and it assumes the position shown in Fig. 3, thereby retaining the litter while the pan is being carried from place to place and in the position it occupies when not in use, thus taking up very little space.

Although I have specifically described the construction and relative arrangement of the several elements of my invention, I do not desire to be confined to the same, as such changes or modifications may be made as clearly fall within the scope of my invention without departing from the spirit thereof.

Having thus fully described my invention, what I claim as new and useful, and desire to secure by Letters Patent of the United States, is—

A dust-pan comprising the chamber B, having an upper transverse beaded edge $b$ and orifices $d\ d$ in the sides D, D, in combination with the handle C formed with integral spring-arms $c\ c$ having notches $c'\ c'$ adapted to engage the contiguous beaded edge $b$ of the dust-chamber, and having their lower angular ends $c^2\ c^2$ turned horizontally outward to pivotally engage the orifices $d\ d$ from the inside of the sides of the dust-chamber, substantially as and for the purpose set forth.

In testimony whereof I hereunto affix my signature in presence of two witnesses.

ANNA C. GEROW.

Witnesses:
HORATIO N. JEX,
JOSEPH ADAMS.